(12) United States Patent
Tashiro

(10) Patent No.: US 9,007,028 B2
(45) Date of Patent: Apr. 14, 2015

(54) CONTROL DEVICE FOR ELECTRIC POWER STORAGE DEVICE AND VEHICLE EQUIPPED WITH THE SAME

(75) Inventor: Hiroki Tashiro, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 118 days.

(21) Appl. No.: 13/634,149

(22) PCT Filed: Apr. 28, 2010

(86) PCT No.: PCT/JP2010/057552
§ 371 (c)(1),
(2), (4) Date: Sep. 11, 2012

(87) PCT Pub. No.: WO2011/135690
PCT Pub. Date: Nov. 3, 2011

(65) Prior Publication Data
US 2013/0043844 A1   Feb. 21, 2013

(51) Int. Cl.
*H02J 7/00* (2006.01)
*H02J 7/14* (2006.01)
(Continued)

(52) U.S. Cl.
CPC ........... *H02J 7/1438* (2013.01); *B60L 15/2045* (2013.01); *B60L 1/003* (2013.01); *B60L 11/1859* (2013.01); *B60L 11/1862* (2013.01); *B60L 11/1868* (2013.01); *B60L 11/1887* (2013.01); *H02J 7/0029* (2013.01); *B60L 3/0046* (2013.01); *B60L 7/14* (2013.01); *B60L 11/005* (2013.01); *B60L 11/14* (2013.01); *Y02T 10/7005* (2013.01); *Y02T 10/7022* (2013.01); *Y02T 10/7283* (2013.01); *B60L 2210/12* (2013.01); *B60L 2240/423* (2013.01); *B60L 2240/545* (2013.01); *B60L 2240/547* (2013.01);
(Continued)

(58) Field of Classification Search
USPC ......... 320/132, 150; 701/22; 180/65.1, 65.29, 180/65.31
See application file for complete search history.

(56) References Cited

U.S. PATENT DOCUMENTS 5,804,947 A   9/1998   Nii et al.
5,936,312 A   8/1999   Koide et al.
(Continued)

FOREIGN PATENT DOCUMENTS

JP   A-8-182112    7/1996
JP   A-10-268946   10/1998
(Continued)

OTHER PUBLICATIONS

Aug. 3, 2010 International Search Report issued in International Application No. PCT/JP2010/057552 (with translation).

*Primary Examiner* — Richard V Muralidar
(74) *Attorney, Agent, or Firm* — Oliff PLC

(57) ABSTRACT

A control device controls charging/discharging of an electric power storage device for supplying electric power to a load device. The control device includes: a limit value setting unit setting a limit value of charging electric power for the electric power storage device based on the state of the electric power storage device; a target setting unit setting a target value of the charging electric power based on the state of the load device and the limit value; a correction unit correcting the limit value based on a difference between the target value and the actual electric power input to and output from the electric power storage device; and a command setting unit setting a command value of the charging electric power based on the state of the load device and the corrected limit value.

10 Claims, 7 Drawing Sheets

(51) Int. Cl.
*B60L 15/20* (2006.01)
*B60L 1/00* (2006.01)
*B60L 11/18* (2006.01)
*B60L 3/00* (2006.01)
*B60L 7/14* (2006.01)
*B60L 11/00* (2006.01)
*B60L 11/14* (2006.01)

(52) U.S. Cl.
CPC ....... *B60L 2240/549* (2013.01); *B60L 2210/40* (2013.01); *B60L 2220/14* (2013.01); *B60L 2240/421* (2013.01); *Y02T 10/7077* (2013.01); *Y02T 10/7044* (2013.01); *Y02T 10/7241* (2013.01); *Y02T 10/7233* (2013.01); *Y02T 10/7066* (2013.01); *Y02T 90/34* (2013.01); *Y02T 10/642* (2013.01)
USPC .......................................... 320/132; 320/150

(56) References Cited

U.S. PATENT DOCUMENTS

| | | | |
|---|---|---|---|
| 6,075,346 A | 6/2000 | Kikuchi et al. | |
| 7,911,077 B2 * | 3/2011 | Ichikawa et al. | 307/9.1 |
| 8,022,674 B2 * | 9/2011 | Miura | 320/132 |
| 8,405,355 B2 * | 3/2013 | Minarcin et al. | 320/132 |
| 2006/0022642 A1 | 2/2006 | McGee et al. | |
| 2010/0255393 A1 | 10/2010 | Imai | |

FOREIGN PATENT DOCUMENTS

| | | |
|---|---|---|
| JP | A-11-187577 | 7/1999 |
| JP | A-2003-219510 | 7/2003 |
| JP | A-2006-94691 | 4/2006 |
| JP | A-2006-174567 | 6/2006 |
| JP | A-2006-320069 | 11/2006 |
| JP | A-2009-110757 | 5/2007 |
| JP | A-2007-252072 | 9/2007 |
| JP | A-2008-260529 | 10/2008 |

* cited by examiner

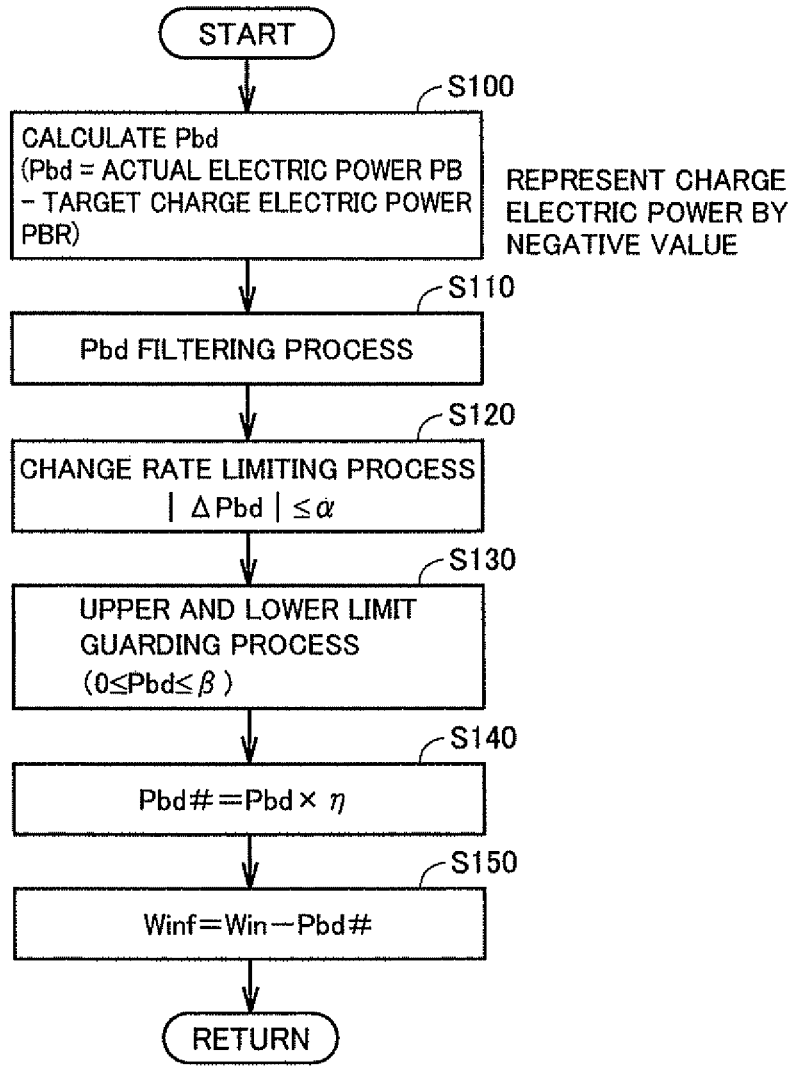

CONTROL DEVICE FOR ELECTRIC POWER STORAGE DEVICE AND VEHICLE EQUIPPED WITH THE SAME

TECHNICAL FIELD

The present invention relates to a control device for an electric power storage device and a vehicle equipped with the same, and more particularly to charging/discharging control of the electric power storage device.

BACKGROUND ART

In recent years, much attention has been given to a vehicle, as an environmentally-friendly vehicle, equipped with an electric power storage device (for example, a secondary battery, a capacitor and the like) and running with the driving force generated from the electric power stored in the electric power storage device. This vehicle includes, for example, an electric vehicle, a hybrid vehicle, a fuel cell vehicle, and the like.

In such a vehicle, in order to prevent failure and deterioration of the electric power storage device caused by overcharging or overdischarging of the electric power storage device provided therein, it is necessary to appropriately control the charging electric power and the discharging electric power for the electric power storage device.

Japanese Patent Laying-Open No. 2003-219510 (PTL 1) discloses a technique for setting a charging electric power upper limit value and a discharging electric power upper limit value of the secondary battery in accordance with the temperature of the secondary battery, and setting a charging/discharging command value of the secondary battery so as not to exceed these upper limit values, thereby allowing charging/discharging to be appropriately managed in accordance with the usage environment and the state of the battery.

CITATION LIST

Patent Literature

PTL 1: Japanese Patent Laying-Open No. 2003-219510
PTL 2: Japanese Patent Laying-Open No. 10-268946
PTL 3: Japanese Patent Laying-Open No. 2007-252072

SUMMARY OF INVENTION

Technical Problem

When controlling charging/discharging of the electric power storage device, it is necessary to appropriately manage the charging electric power and the discharging electric power for the electric power storage device in order to prevent failure and deterioration of the electric power storage device, as described above.

However, when there is a significant gap between the command value of the charging/discharging electric power and the actual charging/discharging electric power, it is considered that the balance between the charging electric power and the discharging electric power may be disrupted.

The present invention has been made to solve the above-described problems. An object of the present invention is to provide a control device for controlling charging/discharging of an electric power storage device so as to allow the charging/discharging electric power to be appropriately managed in consideration of the actual charging electric power.

Solution to Problem

A control device for an electric power storage device according to the present invention includes a limit value setting unit, a target setting unit, a correction unit, and a command setting unit, and controls charging/discharging of the electric power storage device for supplying electric power to a load device. The limit value setting unit sets a limit value of charging electric power for the electric power storage device based on a state of the electric power storage device. The target setting unit sets a target value of the charging electric power for the electric power storage device based on a state of the load device and the limit value. The correction unit corrects the limit value based on the target value and actual electric power input to and output from the electric power storage device. The command setting unit sets a command value of the charging electric power for the electric power storage device based on the state of the load device and the corrected limit value.

Preferably, the electric power storage device has a characteristic that chargeable electric power is reduced when a temperature of the electric power storage device is beyond a predetermined range. The limit value setting unit sets the limit value based on the temperature of the electric power storage device.

Preferably, the correction unit sets correction electric power for correcting the limit value based on a difference between the target value and the actual electric power.

Preferably, the correction unit corrects the limit value such that the correction electric power can be further supplied when a magnitude of charging electric power of the actual electric power is less than a magnitude of the target value. The correction unit does not correct the limit value when a magnitude of the charging electric power of the actual electric power is greater than a magnitude of the target value.

Preferably, when the difference exceeds a predetermined threshold value, the correction unit sets the correction electric power based on the threshold value in place of the difference.

Preferably, the correction unit sets an effective coefficient for determining a ratio of the correction electric power to the difference based on the state of the electric power storage device, and determines the correction electric power by multiplying the difference by the effective coefficient.

Preferably, when a state of charging of the electric power storage device is less than a reference value, the effective coefficient is set to be increased as the temperature of the electric power storage device decreases.

Preferably, the correction unit averages the differences along a time axis direction and sets the correction electric power based on the averaged difference.

Preferably, when a change rate of the difference per unit time in a direction in which the difference increases exceeds a predetermined first threshold value, the correction unit sets the correction electric power based on the first threshold value. When the change rate of the difference per unit time in a direction in which the difference decreases exceeds a predetermined second threshold value, the correction unit sets the correction electric power based on the second threshold value.

A vehicle according to the present invention includes a chargeable electric power storage device, a load device, and a control device for controlling charging/discharging of the electric power storage device. The load device includes a drive device configured to use electric power from the electric power storage device to generate a driving force for driving the vehicle. The control device includes a limit value setting unit, a target setting unit, a correction unit, and a command setting unit. The limit value setting unit sets a limit value of charging electric power for the electric power storage device based on a state of the electric power storage device. The target setting unit sets a target value of the charging electric power for the electric power storage device based on a state of the drive device and the limit value. The correction unit corrects the limit value based on the target value and actual electric power input to and output from the electric power storage device. The command setting unit sets a command value of the charging electric power for the electric power storage device based on a state of the load device and the corrected limit value.

Advantageous Effects of Invention

According to the present invention, in the control device for controlling charging/discharging of the electric power storage device, the charging/discharging electric power can be appropriately managed in consideration of the actual charging electric power.

BRIEF DESCRIPTION OF DRAWINGS

FIG. 8 is a functional flowchart for illustrating details of a process of correction control for the charging electric power upper limit value executed by the ECU in the present embodiment.

DESCRIPTION OF EMBODIMENTS

Figure 1:
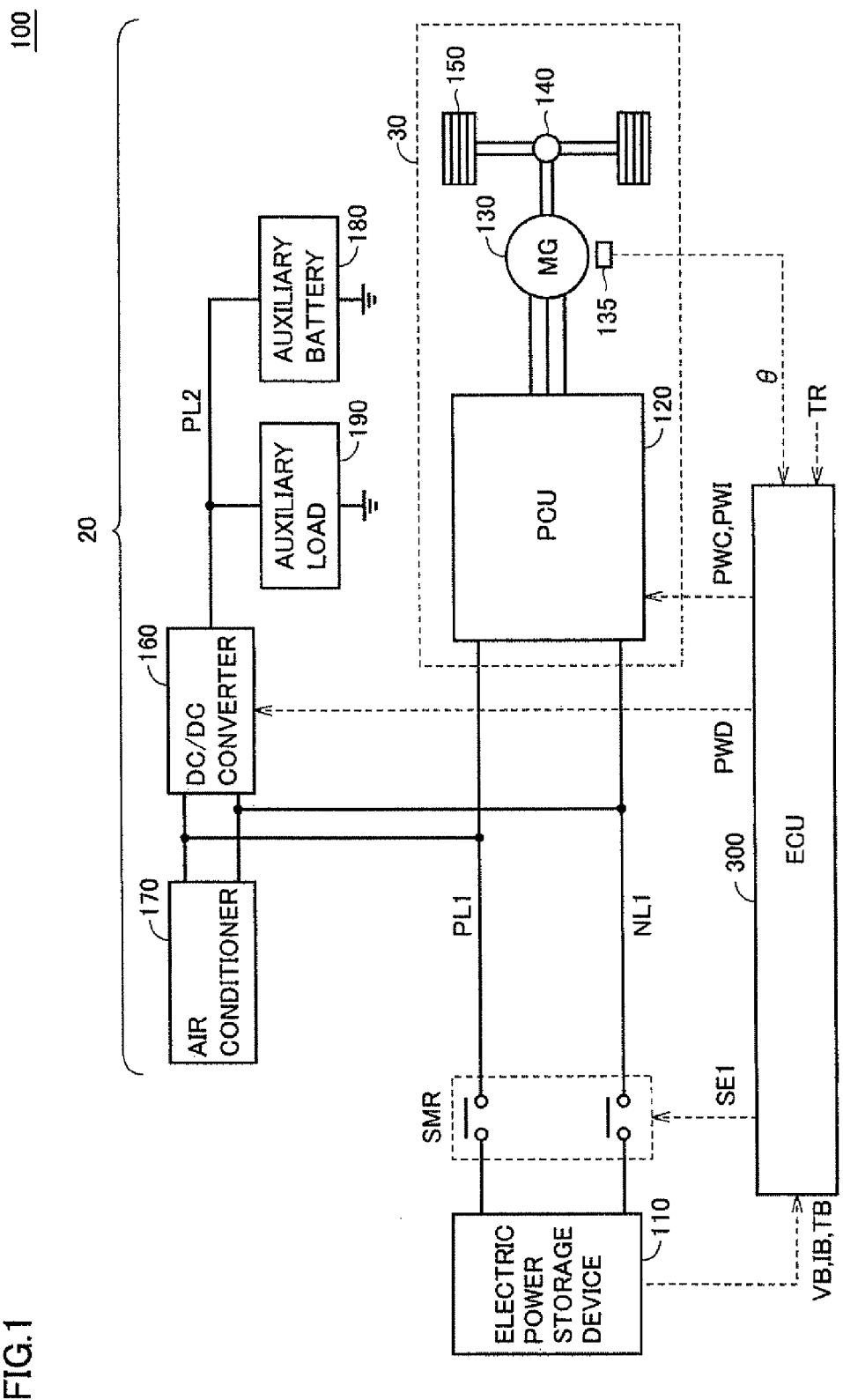
FIG. 1 is an entire block diagram of a vehicle equipped with a control device for an electric power storage device according to the present embodiment.

The embodiments of the present invention will be hereinafter described in detail with reference to the accompanying drawings, in which the same or corresponding components are designated by the same reference characters, and description thereof will not be repeated.

FIG. 1 is an entire block diagram of a vehicle 100 equipped with a control device for an electric power storage device according to the present embodiment.

Referring to FIG. 1, vehicle 100 includes a load device 20, an electric power storage device 110, a system main relay (which will be hereinafter also referred to as an SMR) 115, and a control device (which will be hereinafter referred to as an ECU (Electronic Control Unit)) 300. Load device 20 includes a drive device 30, and, as the configuration of a low voltage system (auxiliary system), a DC/DC converter 160, an air conditioner 170, an auxiliary battery 180, and an auxiliary load 190. Furthermore, drive device 30 includes a PCU (Power Control Unit) 120, a motor generator 130, a rotation angle sensor 135, a power transmission gear 140, and a driving wheel 150.

Electric power storage device 110 is a chargeable and dischargeable electric power storage component. Electric power storage device 110 is configured to include, for example, a secondary battery such as a lithium-ion battery, a nickel-metal hydride battery or a lead acid battery, or a power storage element such as an electric double layer capacitor.

Electric power storage device 110 is connected through SMR 115 to PCU 120 for driving motor generator 130. Electric power storage device 110 supplies the electric power for generating a driving force for vehicle 100 to PCU 120. Furthermore, electric power storage device 110 stores the electric power generated by motor generator 130. The output power of electric power storage device 110 is, for example, 200V.

The relays included in SMR 115 have one ends connected to the positive and negative electrode terminals, respectively, of electric power storage device 110. The relays included in SMR 115 have the other ends connected to an electric power line PL1 and a ground line NL1, respectively, which are connected to PCU 120. Based on a control signal SE1 from ECU 300, SMR 115 switches between supply and interruption of the electric power between electric power storage device 110 and PCU 120.

Figure 2:
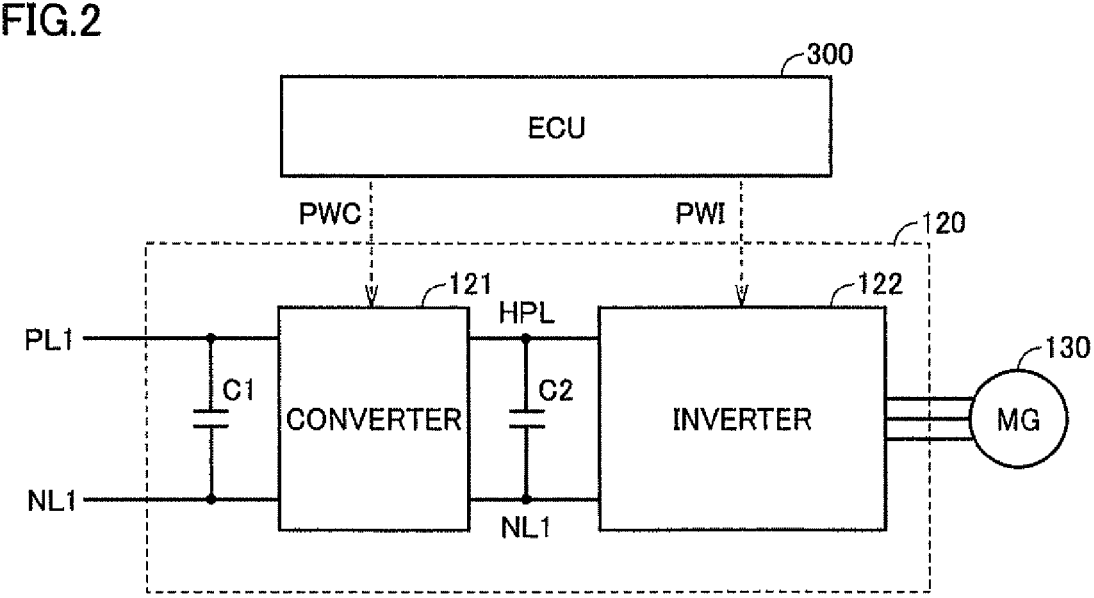
FIG. 2 is a diagram showing an example of the internal configuration of a PCU in FIG. 1.

FIG. 2 is a diagram showing an example of the internal configuration of PCU 120.

Referring to FIG. 2, PCU 120 includes a converter 121, an inverter 122, and capacitors C1 and C2.

Based on a control signal PWC from ECU 300, converter 121 performs power conversion between electric power line PL1, ground line NL1 and an electric power line HPL, ground line NL1.

Inverter 122 is connected to electric power line HPL and ground line NL1. Based on a control signal PWI from ECU 300, inverter 122 converts a direct-current (DC) electric power supplied from converter 121 into an alternating-current (AC) electric power, to drive motor generator 130. Furthermore, although the present embodiment shows an example of the configuration in which the number of pairs of a motor generator and an inverter is one, the number of pairs of a motor generator and an inverter may be more than one.

Capacitor C1 is provided between electric power line PL1 and ground line NL1, and reduces the voltage variation between electric power line PL1 and ground line NL1. Capacitor C2 is provided between electric power line HPL and ground line NL1, and reduces the voltage variation between electric power line HPL and ground line NL1.

Referring back to FIG. 1, motor generator 130 is an AC rotating electric machine, and, for example, a permanent magnet type synchronous electric motor provided with a rotor into which a permanent magnet is embedded.

The output torque of motor generator 130 is transmitted to driving wheel 150 through power transmission gear 140 including a reduction gear and a power split device, for driving vehicle 100. Motor generator 130 can generate electric power by the rotating force of driving wheel 150 during the regenerative braking operation of vehicle 100. PCU 120 then converts the generated electric power into charging electric power for electric power storage device 110.

Furthermore, in the hybrid vehicle equipped with an engine (not shown) in addition to motor generator 130, this engine and motor generator 130 are cooperatively operated to generate the required vehicle driving force. In this case, electric power storage device 110 can also be charged using the electric power generated by the rotation of the engine.

In other words, vehicle 100 according to the present embodiment represents a vehicle provided with an electric motor for generating the vehicle driving force, and includes a hybrid vehicle generating the vehicle driving force by the engine and the electric motor, an electric vehicle and a fuel cell vehicle which are not equipped with an engine, and the like.

A rotation angle sensor (resolver) 135 detects a rotation angle θ of motor generator 130, and transmits this detected rotation angle θ to ECU 300. ECU 300 can calculate a rotation speed MRN and an angular velocity ω (rad/s) of motor generator 130 based on rotation angle θ. In addition, if rotation angle θ is directly calculated by ECU 300 based on the motor voltage and current, rotation angle sensor 135 may be eliminated.

DC/DC converter 160 is connected to electric power line PL1 and ground line NL1. DC/DC converter 160 lowers the DC voltage supplied from electric power storage device 110 based on a control signal PWD from ECU 300. Then, DC/DC converter 160 supplies electric power through an electric power line PL2 to the low voltage system of the entire vehicle, such as auxiliary battery 180, auxiliary load 190 and ECU 300.

Auxiliary battery 180 typically includes a lead acid battery. The output voltage of auxiliary battery 180 is lower than the output voltage of electric power storage device 110, and, for example, approximately 12V.

Auxiliary load 190 includes, for example, a variety of lamps, a wiper, a heater, an audio unit, a navigation system, and the like.

Air conditioner 170 is connected to electric power line PL1 and ground line NL1 in parallel with DC/DC converter 160, and air-conditions the compartment of vehicle 100.

ECU 300 including a CPU (Central Processing Unit), a storage device and an input and output buffer which are not shown in FIG. 1 receives a signal from each sensor and the like and outputs a control signal to each device. ECU 300 also controls vehicle 100 and each device. It is to be noted that the above-described control is not limited to the process by software, but can be carried out by dedicated hardware (an electronic circuit).

ECU 300 outputs the control signal for controlling PCU 120, DC/DC converter 160, SMR 115, and the like.

ECU 300 receives rotation angle θ of motor generator 130 from rotation angle sensor 135 and a torque command value TR of motor generator 130 transmitted from a higher order ECU that is not shown. Based on these pieces of information and the state of electric power storage device 110, ECU 300 generates control signals PWC and PWI of converter 121 and inverter 122, respectively, within PCU 120 in order to drive motor generator 130.

Furthermore, ECU 300 receives detection values of a voltage VB, a current IB and a temperature TB from a sensor (not shown) included in electric power storage device 110. ECU 300 calculates a state of charging SOC of electric power storage device 110 based on these pieces of information. Furthermore, ECU 300 controls the charging/discharging electric power for electric power storage device 110 based on this state of charging SOC and the driving state of vehicle 100.

When controlling charging/discharging of the electric power storage device in the vehicle as described above, in order to prevent deterioration and failure of the electric power storage device resulting from occurrence of overcharging or overdischarging, generally, the upper limit value of each of the charging electric power and the discharging electric power is set for performing control such that the charging/discharging electric power at each moment does not exceed each upper limit value.

Figure 3:
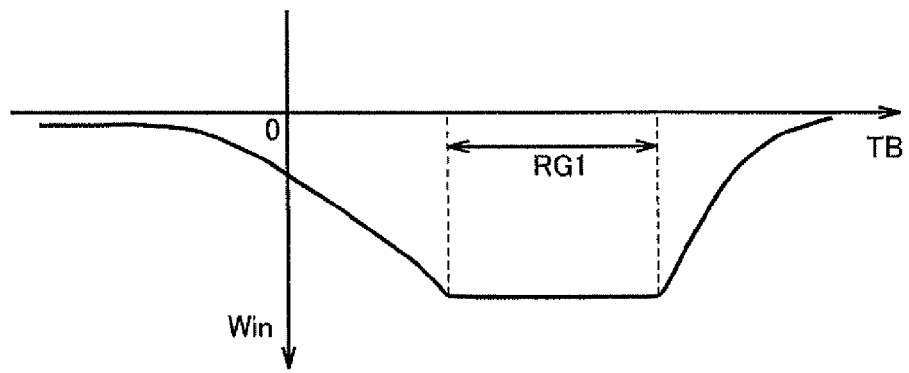
FIG. 3 is a diagram showing an example of the relation between a charging electric power upper limit value and a temperature of the electric power storage device.

This upper limit value of the charging/discharging electric power is determined based on the state of the electric power storage device, for example, the SOC and the temperature of the electric power storage device. FIG. 3 is a diagram showing an example of the relation between a charging electric power upper limit value Win and a temperature TB of the electric power storage device. In FIG. 3 and the subsequent description thereof, the discharging electric power output from the electric power storage device is represented by a positive value while the charging electric power used for charging the electric power storage device is represented by a negative value. As can be seen from FIG. 3, at relatively low and high temperatures at which the temperature of the electric power storage device falls out of the prescribed range (a region RG1 in FIG. 3), the magnitude of charging electric power upper limit value Win (in other words, the absolute value of upper limit value Win) is set to be relatively small.

This is for the purpose of preventing the output voltage of electric power storage device 110 from rising due to the increased internal resistance of electric power storage device 110 at a relatively low temperature. Furthermore, this is also for the purpose of preventing the temperature of electric power storage device 110 from further rising due to heat generation caused by the current flowing through electric power storage device 110 at a relatively high temperature.

Figure 4:
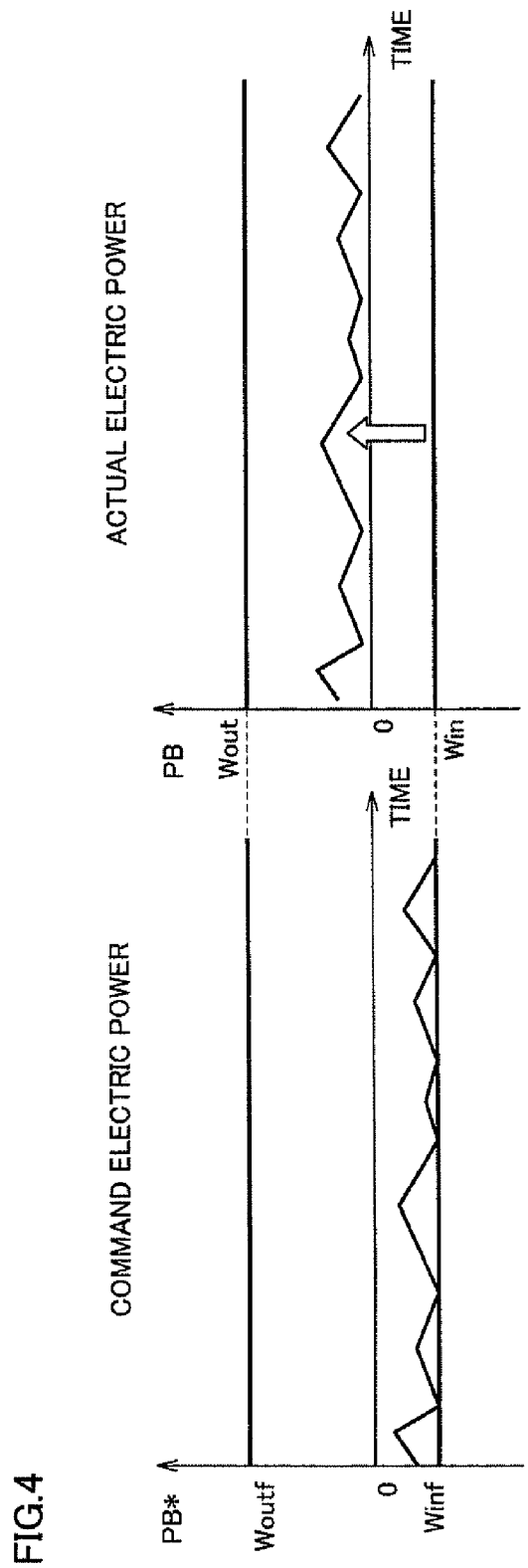
FIG. 4 is a diagram for illustrating comparison between the command electric power and the actual electric power in a comparative example in the case where correction control for the charging electric power upper limit value according to the present embodiment is not applied.

FIG. 4 is a diagram for illustrating comparison between command electric power PB* and actual electric power PB in a comparative example in the case where correction control for the charging electric power upper limit value according to the present embodiment described later is not applied. In FIG. 4, the horizontal axes each represent time while the vertical axes represent command electric power PB* and actual electric power PB, respectively.

Referring to FIG. 4, in this comparative example, the upper limit value of the charging/discharging electric power that is actually required for protecting the electric power storage device at a certain temperature of the electric power storage device (Win, Wout) is identical to the upper limit value used when generating charging/discharging electric power command value PB* (Winf, Woutf). Accordingly, a charging electric power target value PBR determined based on charging electric power upper limit value Win is identical to charging electric power command value PB* set based on upper limit value Winf (PBR=PB*). In the ECU, charging electric power command value PB* is set so as not to exceed upper limit value Winf.

However, this charging electric power target value PBR may often be set mainly based on the electric power storage device and the driving state of the motor generator. Thus, unpredictable electric power such as the electric power consumed by the auxiliary system and the electric power lost in PCU 120 and the like may not be taken into consideration. This may cause a gap between charging electric power target value PBR and actual electric power PB.

Accordingly, in the situation where the magnitude of upper limit value Win is limited as shown in FIG. 3, depending on the electric power corresponding to the amount of such a gap as described above, the electric power may be actually output (discharged) from the electric power storage device, despite issuance of the command for charging the electric power storage device as shown in FIG. 4. This may lead to disruption of the balance between the charging electric power and the discharging electric power, so that the electric power storage device may be overdischarged.

Particularly when a lithium ion battery is employed as an electric power storage device, the magnitude of charging electric power upper limit value Win is limited to be smaller due to the characteristics of this battery, as compared with a nickel-metal hydride battery and the like. Accordingly, disruption of the balance between the charging electric power and the discharging electric power as described above may tend to occur. The similar problem may occur when the capacity of the originally installed electric power storage device is relatively small as in the case of a compact car and also when the capacity of the electric power storage device is decreased for cost reduction.

Accordingly, in the present embodiment, correction control for the charging electric power upper limit value is performed in such a manner that upper limit value Winf is corrected in consideration of the difference between charging electric power target value PBR and actual electric power PB, to set charging electric power command value PB* so as not to exceed corrected upper limit value Winf. Consequently, it becomes possible to reduce the influences caused by power consumption and the like by the auxiliary system that have not been taken into consideration, thereby suppressing disruption of the balance between the charging electric power and the discharging electric power.

Figure 5:
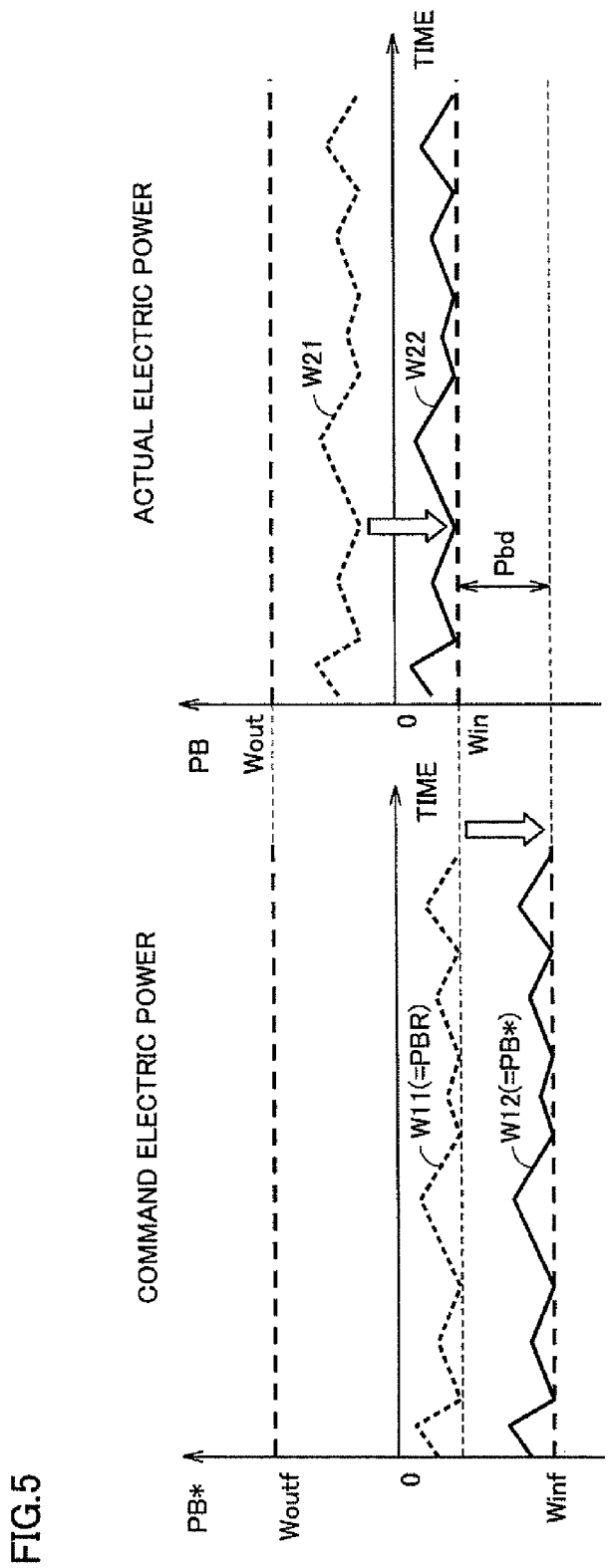
FIG. 5 is a diagram for illustrating comparison between the command electric power and the actual electric power in the case where correction control for the charging electric power upper limit value according to the present embodiment is applied.

FIG. 5 is a diagram showing the outline of correction control for the charging electric power upper limit value according to the present embodiment. In FIG. 5, the horizontal axes each represent time while the vertical axes represent command electric power PB* (and target power PBR) and actual electric power PB, respectively, as in FIG. 4.

Referring to FIGS. 1 and 5, in correction control for the charging electric power upper limit value according to the present embodiment, actual electric power PB (=VB×IB) is calculated in ECU 300 based on voltage VB and current IB of electric power storage device 110. Then calculated is a difference Pbd between this actual electric power PB and charging electric power target value PBR that is determined based on upper limit value Win. Upper limit value Winf used when generating charging electric power command value PB* is set so as to allow the electric power storage device to be charged more by the amount corresponding to difference Pbd calculated as above. In other words, the absolute value of upper limit value Winf is set to be further increased.

ECU 300 sets charging electric power command value PB* based on Winf corrected in this way. Then, the charging electric power command value (=PBR) set based on the upper limit value before correction (that is, Win) shown by a dashed line W11 in FIG. 5 is shifted from the point limited at upper limit value Win to the direction in which the charging electric power is increased, thereby being brought into a state like charging electric power command value PB* shown by a solid line W12. Consequently, the actual electric power is shifted from a dashed line W21 to a solid line W22, and therefore, approximates to charging electric power target value PBR based on upper limit value Win of the actual charging electric power in electric power storage device 110. Accordingly, disruption of the balance between the charging electric power and the discharging electric power can be prevented.

The above-described gap between charging electric power target value PBR and actual electric power PB is particularly problematic when the SOC of electric power storage device 110 decreases and charging is required, and/or when temperature TB of electric power storage device 110 falls and charging electric power upper limit value Win is limited. In contrast, in the case where the SOC of electric power storage device 110 is relatively large and where temperature TB of electric power storage device 110 does not fall, correcting charging electric power upper limit value Winf as explained with reference to FIG. 5 may increase the charging electric power for electric power storage device 110, thereby possibly causing overcharging.

Accordingly, it is more preferable to introduce an effective coefficient η for determining how much difference Pbd between actual electric power PB and charging electric power target value PBR is reflected on correction of charging electric power upper limit value Winf, to change charging electric power upper limit value Winf based on the SOC of electric power storage device 110 and temperature TB of electric power storage device 110.

Figure 6:
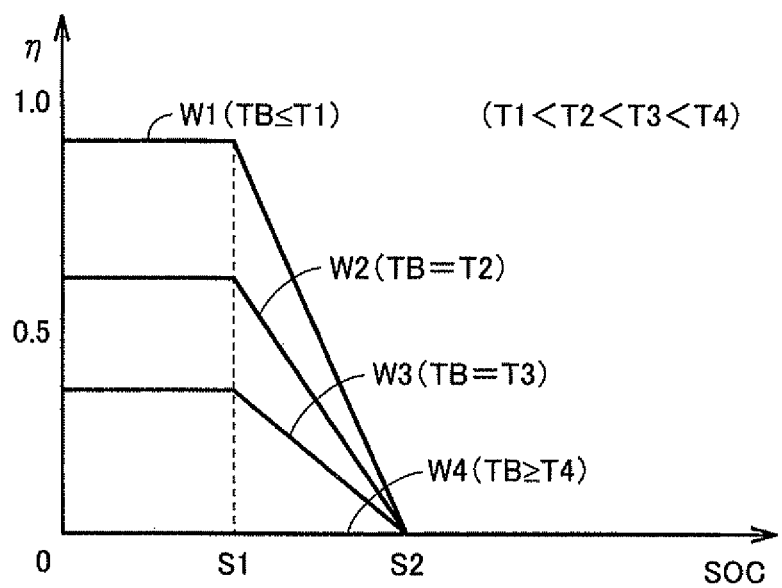
FIG. 6 is a diagram showing an example of a map of the effective coefficient in the present embodiment.

FIG. 6 is a diagram showing an example of the map of effective coefficient η in correction of charging electric power upper limit value Winf. This effective coefficient η is a coefficient having values from 0 to 1.0. Effective coefficient η is multiplied by difference Pbd between actual electric power PB and charging electric power target value PBR, to obtain a calculation result, that is, a corrected value Pbd#(=Pbd×η) which is then used to correct charging electric power upper limit value Winf.

Referring to FIG. 6, for example, as with line W1 in FIG. 6, effective coefficient η is set to be approximately zero when the SOC of electric power storage device 110 is greater than S2, and set to be gradually increased as the SOC of electric power storage device 110 becomes less than S2. Then, when the SOC of electric power storage device 110 is less than S1 (S1<S2), effective coefficient η is set to be maintained at the coefficient at the time when the SOC of electric power storage device 110 is at S1.

Furthermore, effective coefficient η is set to be increased in value as temperature TB of electric power storage device 110 decreases. In addition, effective coefficient η is set to be decreased in value, like lines W2, W3 and W4 in FIG. 6, as temperature TB of electric power storage device 110 increases.

In this way, when correcting charging electric power upper limit value Winf, effective coefficient η is introduced to thereby allow precise adjustment in accordance with the characteristics of electric power storage device 110 and load device 20 in vehicle 100.

In the present embodiment, this effective coefficient η is not necessarily used and may not be used. Also as to the map of effective coefficient η, for example, a threshold value S2 of the SOC in FIG. 6 can be variable in accordance with temperature TB, or each line can be differently shaped.

Figure 7:
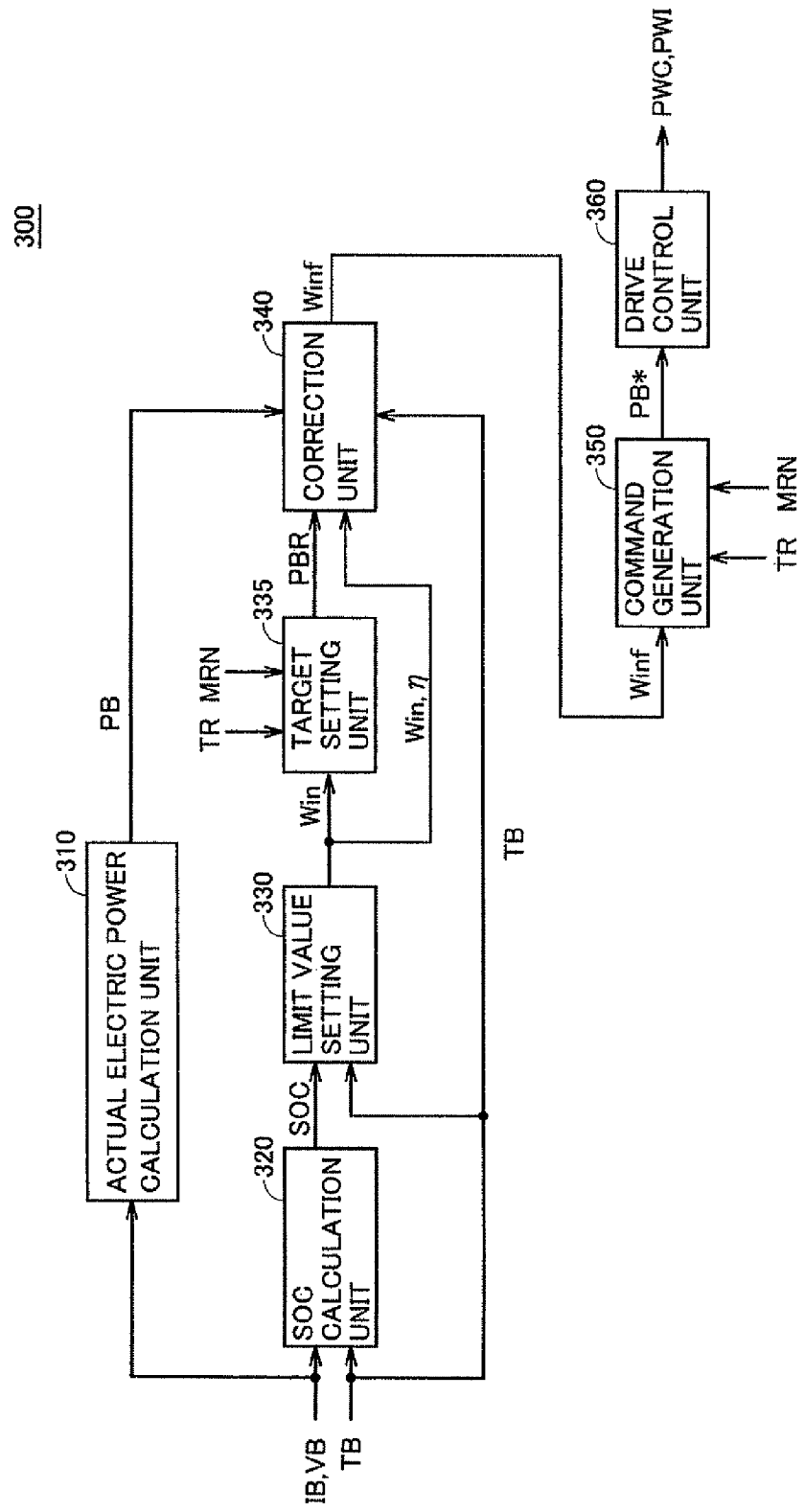
FIG. 7 is a functional block diagram for illustrating correction control for the charging electric power upper limit value executed by an ECU in the present embodiment.

FIG. 7 is a functional block diagram for illustrating correction control for the charging electric power upper limit value executed by ECU 300 in the present embodiment. Each functional block shown in the functional block diagram illustrated with reference to FIG. 7 is implemented by a hardware-based or software-based process by ECU 300.

Referring to FIGS. 1 and 7, ECU 300 includes an actual electric power calculation unit 310, an SOC calculation unit 320, a limit value setting unit 330, a target setting unit 335, a correction unit 340, a command generation unit 350, and a drive control unit 360.

Actual electric power calculation unit 310 receives detection values of voltage VB and current IB of electric power storage device 110 from electric power storage device 110. Then, based on voltage VB and current IB described above, actual electric power calculation unit 310 calculates actual electric power PB actually input to and output from the electric power storage device, and then, outputs the resultant to correction unit 340.

SOC calculation unit 320 receives detection values of voltage VB, current IB and temperature TB of electric power storage device 110. Then, based on these pieces of information, SOC calculation unit calculates the SOC of electric power storage device 110 and outputs the resultant to limit value setting unit 330.

Limit value setting unit 330 receives the detection value of temperature TB of electric power storage device 110 and the SOC of electric power storage device 110 from SOC calculation unit 320. Then, limit value setting unit 330 sets charging electric power upper limit value Win, for example, by using the predetermined map. Furthermore, based on the SOC and temperature TB, limit value setting unit 330 calculates effective coefficient $\eta$ using the map as described with reference to FIG. 6. Then, limit value setting unit 330 outputs upper limit value Win that has been set to target setting unit 335 and outputs upper limit value Win and effective coefficient $\eta$ to correction unit 340.

Target setting unit 335 receives upper limit value Win from limit value setting unit 330. Furthermore, target setting unit 335 receives torque command value TR of motor generator 130 determined based on the accelerator pedal position, the SOC and the like, and also receives rotation speed MRN calculated based on rotation angle $\theta$ from rotation angle sensor 135. Based on these pieces of information, target setting unit 335 sets charging/discharging electric power target value PBR so as not to exceed upper limit value Win. Then, target setting unit 335 outputs this charging/discharging electric power target value PBR to correction unit 340.

Correction unit 340 receives upper limit value Win and effective coefficient $\eta$ set by limit value setting unit 330, the detection value of temperature TB of electric power storage device 110, and actual electric power PB calculated by actual electric power calculation unit 310. Furthermore, correction unit 340 receives charging electric power target value PBR from target setting unit 335.

Correction unit 340 calculates difference Pbd between actual electric power PB and charging electric power target value PBR, and multiplies difference Pbd by effective coefficient $\eta$ to calculate the corrected value of upper limit value Win. In this case, in order to prevent the corrected value from being abruptly changed and from becoming excessively large, various limiting processes are performed in combination. Then, by subtracting this corrected value from upper limit value Win received from limit value setting unit 330, correction unit 340 calculates upper limit value Winf after correction and outputs the resultant to command generation unit 350.

Command generation unit 350 receives the corrected charging electric power upper limit value Winf from correction unit 340. Furthermore, command generation unit 350 receives torque command value TR of motor generator 130 and rotation speed MRN calculated based on rotation angle $\theta$ from rotation angle sensor 135. Based on these pieces of information, command generation unit 350 generates charging/discharging electric power command value PB* so as not to exceed the corrected upper limit value Winf. Then, command generation unit 350 outputs this charging/discharging electric power command value PB* to drive control unit 360.

Based on charging/discharging electric power command value PB* from command generation unit 350 and the driving state of motor generator 130, drive control unit 360 generates control signals PWC and PWI for converter 121 and inverter 122, respectively, shown in FIG. 2 to control converter 121 and inverter 122.

FIG. 8 is a flowchart for illustrating details of the process of correction control for the charging electric power upper limit value executed by ECU 300 in the present embodiment. As to the flowchart shown in FIG. 8, the process is implemented by calling the program stored in ECU 300 in advance from a main routine and executing this program in predetermined cycles. Furthermore, in a part or all of the steps, the process can also be implemented by constructing dedicated hardware (an electronic circuit).

Referring to FIGS. 1 and 8, ECU 300 calculates difference Pbd between actual electric power PB and charging electric power target value PBR in step (which will be hereinafter abbreviated as S) 100. In the present embodiment, the charging electric power is represented by a negative value as described above. Accordingly, the greater the charging electric power is, the more the absolute value is increased in the negative direction.

Then, ECU 300 performs a filtering process for averaging the calculated differences Pbd along the time axis direction. This filtering process is performed for actual electric power PB and charging electric power target value PBR which vary with time, in order to smooth variations of the calculated value of difference Pbd in the transient state that are caused by the influences such as detection errors and control delay of the sensor or external noise to signals. As the filtering process, for example, it is possible to employ known processing methods such as a first-order lag function having a certain time constant or a moving average of a plurality of calculated values during a prescribed time period.

ECU 300 performs a process of limiting the change rate of difference Pbd in S120. This process aims to set the absolute value of a difference $\Delta$Pbd between the value of difference Pbd in the previous calculation cycle and the value of difference Pbd in the present calculation cycle to be not more than a threshold value $\alpha$. In other words, when the absolute value of difference $\Delta$Pbd exceeds threshold value $\alpha$, difference Pbd in the present calculation cycle is set such that the absolute value of difference $\Delta$Pbd is set equal to threshold value $\alpha$. Consequently, excessive correction can be prevented when difference Pbd between actual electric power PB and charging electric power command value PB* greatly varies transiently.

ECU 300 performs a process of limiting the upper and lower limits of difference Pbd in S130. Specifically, difference Pbd is set to fall within a range of $0 \leq Pbd \leq \beta$. In other words, difference Pbd is replaced with zero when it is a negative value while difference Pbd is replaced with $\beta$ when it exceeds a threshold value $\beta$. This is for the purpose of causing correction of the charging electric power upper limit value in this control to be performed when difference Pbd is positive, that is, only when the magnitude of actual charging electric power PB is smaller than charging electric power command value PB* by the discharging electric power by the auxiliary machine and the like, and also for the purpose of preventing overdischarging caused by excessive correction.

Then, in S140, ECU 300 multiplies effective coefficient $\eta$ determined based on the SOC and temperature TB of electric power storage device 110 and described with reference to FIG. 6 by difference Pbd, to calculate corrected value Pbd#.

Then, ECU 300 subtracts this corrected value Pbd# from charging electric power upper limit value Win, to calculate upper limit value Winf used for generating charging electric power command value PB*. Consequently, upper limit value Winf is set to be shifted in the direction in which the charging electric power is further increased, as described with reference to FIG. 5.

Then, the process is returned to the main routine, in which the corrected upper limit value Winf is used to calculate charging electric power command value PB* and, based on this value, converter 121 and inverter 122 within PCU 120 are controlled.

By performing control in accordance with the process as described above, the charging electric power command value can be set in consideration of the actual charging electric power including the electric power consumed by auxiliary machines and the like. Consequently, it becomes possible to prevent discharging from actually occurring despite issuance of the command for charging the electric power storage device. Accordingly, disruption of the balance between the charging electric power and the discharging electric power is suppressed and the charging/discharging electric power can be appropriately managed.

Although the explanation has been given in the above-described embodiment with regard to the case where the charging electric power upper limit value is corrected based on the "difference" between the charging electric power target value and the actual electric power, the correction amount may be set based on the "ratio" between the charging electric power target value and the actual electric power.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

20 load device, 30 drive device, 100 vehicle, 110 electric power storage device, 115 SMR, 120 PCU, 121 converter, 122 inverter, 130 motor generator, 135 rotation angle sensor, 140 power transmission gear, 150 driving wheel, 160 DC/DC converter, 170 air conditioner, 180 auxiliary battery, 190 auxiliary load, 300 ECU, 310 actual electric power calculation unit, 320 SOC calculation unit, 330 limit value setting unit, 340 correction unit, 350 command generation unit, 360 drive control unit, C1, C2 capacitor, HPL, PL1, PL2 electric power line, NL1 ground line.

The invention claimed is:

1. A control device for an electric power storage device, for controlling charging/discharging of the electric power storage device for supplying electric power to a load device, said control device comprising:
   a limit value setting unit setting a limit value of charging electric power for said electric power storage device based on a state of said electric power storage device;
   a target setting unit setting a target value of the charging electric power for said electric power storage device based on a state of said load device and said limit value;
   a correction unit correcting said limit value based on said target value and actual electric power input to and output from said electric power storage device; and
   a command setting unit setting a command value of the charging electric power for said electric power storage device based on the state of said load device and the corrected limit value.

2. The control device for an electric power storage device according to claim 1, wherein
   said electric power storage device has a characteristic that chargeable electric power is reduced when a temperature of said electric power storage device is beyond a predetermined range, and
   said limit value setting unit sets said limit value based on the temperature of said electric power storage device.

3. The control device for an electric power storage device according to claim 2, wherein said correction unit sets correction electric power for correcting said limit value based on a difference between said target value and said actual electric power.

4. The control device for an electric power storage device according to claim 3, wherein
   said correction unit corrects said limit value such that said correction electric power can be further supplied when a magnitude of charging electric power of said actual electric power is less than a magnitude of said target value, and
   said correction unit does not correct said limit value when a magnitude of the charging electric power of said actual electric power is greater than a magnitude of said target value.

5. The control device for an electric power storage device according to claim 4, wherein, when said difference exceeds a predetermined threshold value, said correction unit sets said correction electric power based on said threshold value in place of said difference.

6. The control device for an electric power storage device according to claim 3, wherein said correction unit sets an effective coefficient for determining a ratio of said correction electric power to said difference based on the state of said electric power storage device, and determines said correction electric power by multiplying said difference by said effective coefficient.

7. The control device for an electric power storage device according to claim 6, wherein, when a state of charging of said electric power storage device is less than a reference value, said effective coefficient is set to be increased as the temperature of said electric power storage device decreases.

8. The control device for an electric power storage device according to claim 3, wherein said correction unit averages the differences along a time axis direction and sets said correction electric power based on the averaged difference.

9. The control device for an electric power storage device according to claim 3, wherein
   when a change rate of said difference per unit time in a direction in which said difference increases exceeds a predetermined first threshold value, said correction unit sets said correction electric power based on said first threshold value, and
   when the change rate of said difference per unit time in a direction in which said difference decreases exceeds a predetermined second threshold value, said correction unit sets said correction electric power based on said second threshold value.

10. A vehicle comprising:
    a chargeable electric power storage device;
    a load device including a drive device configured to use electric power from said electric power storage device to generate a driving force for driving said vehicle; and
    a control device for controlling charging/discharging of said electric power storage device,
    said control device including
    a limit value setting unit setting a limit value of charging electric power for said electric power storage device based on a state of said electric power storage device,
    a target setting unit setting a target value of the charging electric power for said electric power storage device based on a state of said drive device and said limit value,
    a correction unit correcting said limit value based on said target value and actual electric power input to and output from said electric power storage device, and a command setting unit setting a command value of the charging electric power for said electric power storage device based on a state of said load device and the corrected limit value.

* * * * *